US011044702B2

(12) United States Patent
Alasti et al.

(10) Patent No.: US 11,044,702 B2
(45) Date of Patent: Jun. 22, 2021

(54) REPLICATED GRANT-FREE TRANSMISSIONS UTILIZING MULTIPLE CONFIGURATIONS

(71) Applicant: DISH Wireless L.L.C., Englewood, CO (US)

(72) Inventors: Mehdi Alasti, Reston, VA (US); Mariam Sorond, Reston, VA (US); Siddhartha Chenumolu, Broadlands, VA (US)

(73) Assignee: DISH Wireless L.L.C., Englewood, CO (US)

( * ) Notice: Subject to any disclaimer, the term of this patent is extended or adjusted under 35 U.S.C. 154(b) by 139 days.

(21) Appl. No.: 16/277,147

(22) Filed: Feb. 15, 2019

(65) Prior Publication Data
US 2020/0146031 A1 May 7, 2020

Related U.S. Application Data

(60) Provisional application No. 62/754,075, filed on Nov. 1, 2018.

(51) Int. Cl.
| | |
|---|---|
| *H04W 72/02* | (2009.01) |
| *H04W 72/04* | (2009.01) |
| *H04W 74/00* | (2009.01) |
| *H04L 1/00* | (2006.01) |
| *H04L 1/18* | (2006.01) |
| *H04J 11/00* | (2006.01) |

(Continued)

(52) U.S. Cl.
CPC .......... *H04W 72/02* (2013.01); *H04J 11/004* (2013.01); *H04L 1/189* (2013.01); *H04W 72/044* (2013.01); *H04W 72/1263* (2013.01); *H04W 84/042* (2013.01)

(58) Field of Classification Search
None
See application file for complete search history.

(56) References Cited

U.S. PATENT DOCUMENTS

| | | | |
|---|---|---|---|
| 2017/0290052 A1* | 10/2017 | Zhang | H04L 1/1896 |
| 2018/0035459 A1* | 2/2018 | Islam | H04W 74/04 |
| 2018/0123765 A1 | 5/2018 | Cao et al. | |

(Continued)

OTHER PUBLICATIONS

NTT DOCOMO et al., "Overall solutions for UL grant free transmission", 3GPP Draft; R1-1711111, 3$^{rd}$ Generation Partnership Project, Mobile Competence Centre; 650, Route Des Lucioles; F-06921 Sophia-Antipolis Cedex; France, vol. RAN WG1, No. Qingdao, P.R. China; Jun. 27, 2017-Jun. 30, 2017 Jun. 26, 2017, XP051300311, Retrieved from the Internet: URL: http://www.3gpp.org/ftp/Meetings_3GPP_SYNC/RAN1/Docs/ [retrieved on Jun. 26, 2017] section 3.

(Continued)

*Primary Examiner* — Scott M Sciacca
(74) *Attorney, Agent, or Firm* — Kilpatrick Townsend & Stockton LLP

(57) ABSTRACT

Various arrangements for using multiple grant-free transmission configurations are presented. A cellular network may assign multiple grant-free transmission configurations to an instance of user equipment. The cellular network may receive a set of data according to the first grant-free transmission configuration and a replication of the set of data according to the second grant-free transmission configuration.

15 Claims, 8 Drawing Sheets

(51) Int. Cl.
*H04W 72/12* (2009.01)
*H04W 84/04* (2009.01)

(56) References Cited

U.S. PATENT DOCUMENTS

| | | |
|---|---|---|
| 2018/0199359 A1 | 7/2018 | Cao et al. |
| 2018/0270880 A1* | 9/2018 | Hosseini ............... H04L 1/0009 |
| 2018/0279315 A1 | 9/2018 | Salem et al. |
| 2019/0053267 A1 | 2/2019 | Kim et al. |
| 2019/0357269 A1 | 11/2019 | Wu et al. |
| 2020/0015263 A1 | 1/2020 | Huang et al. |
| 2020/0036481 A1 | 1/2020 | Chen et al. |
| 2020/0077431 A1 | 3/2020 | Tang |

OTHER PUBLICATIONS

Bockelmann Carsten et al: "Towards Massive Connectivity Support for Scalable mMTC Communications in 5G Networks," IEEE Access, vol. 6, Jun. 20, 2018, pp. 28969-28992, XP011685593, DOI: 10.1109/Access.2018.287382 [retrieved on Jun. 15, 2018] section I. "Introduction"; p. 28969-p. 28970 section "B. Coded Random Access With Physical Layer Network Coding (CRAPLNC)"; p. 28981-p. 28982; figure 14 p. 28983; figure 17 p. 28984, col. 1 section VII. "Conclusions"; p. 28988.

Paolini Enrico et al.: "Coded random access: applying codes on graphs to design random access protocols", IEEE Communications Magazine, IEEE Service Center, Picsctaway, US, vol. 53, No. 6, Jun. 1, 2015 pp. 144-150, XP011583756, ISSN: 0163-6804, DOI: 10.1109/MCOM.2015.7120031 [retrieved on Jun. 8, 2015] abstract section "Basics of Coded Random Access"; p. 145; figure 1 section "Case Study: Upgrading the Existing Slotted ALOHA Implementation"; p. 148-p. 149.

Jinho Choi: "Layered Non-Orthogonal Random Access With SIC and Transmit Diversity for Reliable Transmissions", IEEE Transactions on Communications., vol. 66, No. 3, Dec. 6, 2017, pp. 1262-1272, XP055663667, Piscataway, NJ. USA. ISSN: 0090-6778, DOI: 10.1109/TCOMM.2017.2780235 abstract section "A. Layered Random Access"; p. 1263 section IV. "Random CRRD for Reliable Transmissions With a Delay Constraint"; p. 1266-p. 1267.

NTT DOCOMO et al: "UL data transmission without UL grant", 3GPP Draft; R1-1713952, $3^{rd}$ Generation Partnership Project (3GPP), Mobile Competence Centre; 650, Route Des Lucioles; F-06921 Sophia-Antipolis Cedex; France; vol. RAN WG1, No. Prague, Czechia; Aug. 21, 2017-Aug. 25, 2017 Aug. 20, 2017, XP051316744, Retrieved from the Internet: URL: http://www.3gpp.org/ftp/Meetings_3GPP_SYNC/RAN1/Docs/ [retrieved on Aug. 20, 2017] the whole document.

International Search Report and Written Opinion for PCT/US2019/057640 (094810-1163093) dated Feb. 4, 2020, all pages.

International Search Report and Written Opinion for PCT/US2019/057639 (094810-1162597) dated Feb. 10, 2020, all pages.

* cited by examiner

REPLICATED GRANT-FREE TRANSMISSIONS UTILIZING MULTIPLE CONFIGURATIONS

CROSS-REFERENCES TO RELATED APPLICATIONS

This application claims priority to U.S. provisional patent application Ser. No. 62/754,075, entitled "Robust Grant-Free Transmissions," filed on Nov. 1, 2018, the entire disclosure of which is hereby incorporated by reference for all purposes.

BACKGROUND

Grant-free transmissions allow for user equipment (UE) to transmit data packets at defined times on defined frequencies (e.g., sub-carriers of OFDM physical resource blocks) without first requesting and receiving a reservation with a base station. Such grant-free transmissions decrease the amount of communication delay and overhead required to schedule a data transmission from the UE to a base station. However, since the frequency and time slot is not reserved for the UE, it is possible that a second UE will transmit data on the same frequency and in the same time slot. When two UEs transmit at the same time on the same frequency, a collision results, which may typically prevent the base station from accurately determining that data transmitted by either UE as part of the collision.

SUMMARY

Various systems and methods for grant-free transmission configurations are detailed herein. In some embodiments, a system for using multiple grant-free transmission configurations is presented. The system may include a cellular wireless network comprising a plurality of base stations. The network may assign a plurality of grant-free transmission configurations to an instance of user equipment. Each grant-free transmission configuration of the plurality of grant-free transmission configurations may define one or more time-windows and one or more frequencies corresponding to the one or more time-windows. Indications of the plurality of grant-free transmission configurations may be transmitted to the instance of user equipment. The instance of user equipment may be configured to receive the indications of the plurality of grant-free transmission configurations. The instance of UE may be configured to schedule a set of data for transmission using a first grant-free transmission configuration of the plurality of grant-free transmission configurations. The instance of UE may be configured to schedule a replication of the set of data for transmission using a second grant-free transmission configuration of the plurality of grant-free transmission configurations. The instance of UE may be configured to transmit the set of data using the first grant-free transmission configuration and the replication of the set of data using the second grant-free transmission configuration.

Embodiments of such a system may include one or more of the following features: The cellular wireless network may be further configured to receive the set of data according to the first grant-free transmission configuration. The cellular wireless network may be further configured to receive the replication of the set of data according to the second grant-free transmission configuration. The cellular wireless network may be further configured to detect that the instance of user equipment has transmitted the set of data using the first grant-free transmission configuration and the replication of the set of data using the second grant-free transmission configuration. The cellular wireless network may be further configured to detect that a collision has occurred involving the set of data received via the first grant-free transmission configuration and a received second set of data. The cellular wireless network may be further configured to reconstruct the received second set of data based at least in part on the received replication of the set of data using the second grant-free transmission configuration. The cellular wireless network being configured to reconstruct the received second set of data may include the cellular wireless network performing successive interference cancellation (SIC) on the received second set of data using the received replication of the set of data. The cellular wireless network may use a 5G NR air interface and the plurality of base stations may be gNodeBs. Each grant-free transmission configuration of the plurality of grant-free transmission configurations may define a plurality of time windows and a plurality of frequencies. There may be no repeated combination of a time window and frequency in the plurality of grant-free transmission configurations. The cellular wireless network may be further configured to determine to authorize grant-free transmissions for the instance of user equipment using multiple grant-free transmission configurations. The cellular wireless network may be further configured to transmit a message to the instance of user equipment that indicates the instance of user equipment is authorized to transmit grant-free transmissions using more than one grant-free transmission configuration. The instance of user equipment may be further configured to determine to transmit grant-free transmissions using multiple grant-free transmission configurations at least in part based on receiving the message that indicates the instance of user equipment is authorized to transmit grant-free transmissions using more than one grant-free transmission configuration.

A method for using multiple grant-free transmission configurations may be presented in various embodiments. The method may include assigning, by a cellular network, a plurality of grant-free transmission configurations to an instance of user equipment. The plurality of grant-free transmission configurations may include a first grant-free transmission configuration and a second grant-free transmission configuration. Each grant-free transmission configuration of the plurality of grant-free transmission configurations may define one or more time-windows and one or more frequencies corresponding to the one or more time-windows. The method may include transmitting, by the cellular network, definitions of the plurality of grant-free transmission configurations to the instance of user equipment. The method may include receiving, by the cellular network, a set of data according to the first grant-free transmission configuration. The method may include receiving, by the cellular network, a replication of the set of data according to the second grant-free transmission configuration. The method may include detecting, by the cellular network, that the instance of user equipment has transmitted the set of data using the first grant-free transmission configuration and the replication of the set of data using the second grant-free transmission configuration.

Embodiments of such a method may include one or more of the following features: The method may include receiving, by the instance of user equipment, the definitions of the plurality of grant-free transmission configurations. The method may include scheduling, by the instance of user equipment, the set of data for transmission using the first grant-free transmission configuration of the plurality of grant-free transmission configurations. The method may include scheduling, by the instance of user equipment, the replication of the set of data for transmission using the second grant-free transmission configuration of the plurality of grant-free transmission configurations. The method may include transmitting, by the instance of user equipment, the set of data using the first grant-free transmission configuration and the replication of the set of data using the second grant-free transmission configuration. The method may include detecting, by the cellular network, that a collision has occurred involving the set of data received via the first grant-free transmission configuration and a second set of data received during a same time-window and a same frequency as at least a portion of the set of data. The method may include reconstructing, by the cellular network, the second set of data based at least in part on the received replication of the set of data using the second grant-free transmission configuration. The cellular network being configured to reconstruct the received second set of data may include the cellular network performing successive interference cancellation (SIC) on the second set of data using the received replication of the set of data. The cellular network may use a 5G NR air interface and a base station that communicates with the instance of user equipment may be a gNodeB. Each grant-free transmission configuration of the plurality of grant-free transmission configurations may define a plurality of time windows and a plurality of frequencies. The method may include determining, by the cellular network, to authorize grant-free transmissions for the instance of user equipment using multiple grant-free transmission configurations. The method may include transmitting, by the cellular network, a message to the instance of user equipment that indicates the instance of user equipment is authorized to transmit grant-free transmissions using more than one grant-free transmission configuration. The method may include determining, by the instance of user equipment, to transmit grant-free transmissions using multiple grant-free transmission configurations at least in part based on receiving the message that indicates the instance of user equipment is authorized to transmit grant-free transmissions using more than one grant-free transmission configuration.

In some embodiments, a non-transitory processor-readable medium for using multiple grant-free transmission configurations may be presented. The medium may include instructions that cause one or more processors to assign a plurality of grant-free transmission configurations to an instance of user equipment. The plurality of grant-free transmission configurations may include a first grant-free transmission configuration and a second grant-free transmission configuration. Each grant-free transmission configuration of the plurality of grant-free transmission configurations may define one or more time-windows and one or more frequencies corresponding to the one or more time-windows. The medium may include instructions that cause one or more processors to cause definitions of the plurality of grant-free transmission configurations to be transmitted to the instance of user equipment. The medium may include instructions that cause one or more processors to receive a set of data according to the first grant-free transmission configuration. The medium may include instructions that cause one or more processors to receive the replication of the set of data according to the second grant-free transmission configuration. The medium may include instructions that cause one or more processors to detect that the instance of user equipment has transmitted the set of data using the first grant-free transmission configuration and the replication of the set of data using the second grant-free transmission configuration.

DETAILED DESCRIPTION

A grant-free (GF) transmission allows an instance of user equipment (UE) to transmit data to a cellular network base station without first requesting permission. A GF transmission may occur during a predefined time-window on a pre-defined frequency that has been assigned by the base station. The base station, or a system in communication with the base station, may schedule different instances of UE at different times and/or different frequencies in order to decrease the likelihood of two instances of UE each transmitting GF transmissions at the same time.

In order to improve efficiency, there may be times when one instance of UE may have been scheduled by the base station to be permitted to transmit a GF transmission at the same time and frequency during which another instance UE has been scheduled to be permitted to send GF transmissions. In such a circumstance, the base station may have detected a significant period of time elapsing without the second instance of UE sending a GF transmission and, therefore, may have "double-booked" the time-window and frequency for the sake of efficiency. While such scheduling may result in more dense and efficient use of the available bandwidth for GF transmissions, occasionally GF transmissions may be sent by multiple instances of UE according to their schedules at the same time and frequency, resulting in a collision.

Such a collision may result in the base station not being able to successfully decode data received during the collision from either instance of UE. However, it may be possible using the techniques detailed herein to efficiently schedule GF transmissions and, additionally, be able to recover data involved in a collision. Details regarding such embodiments are provided in relation to the figures.

Figure 1:
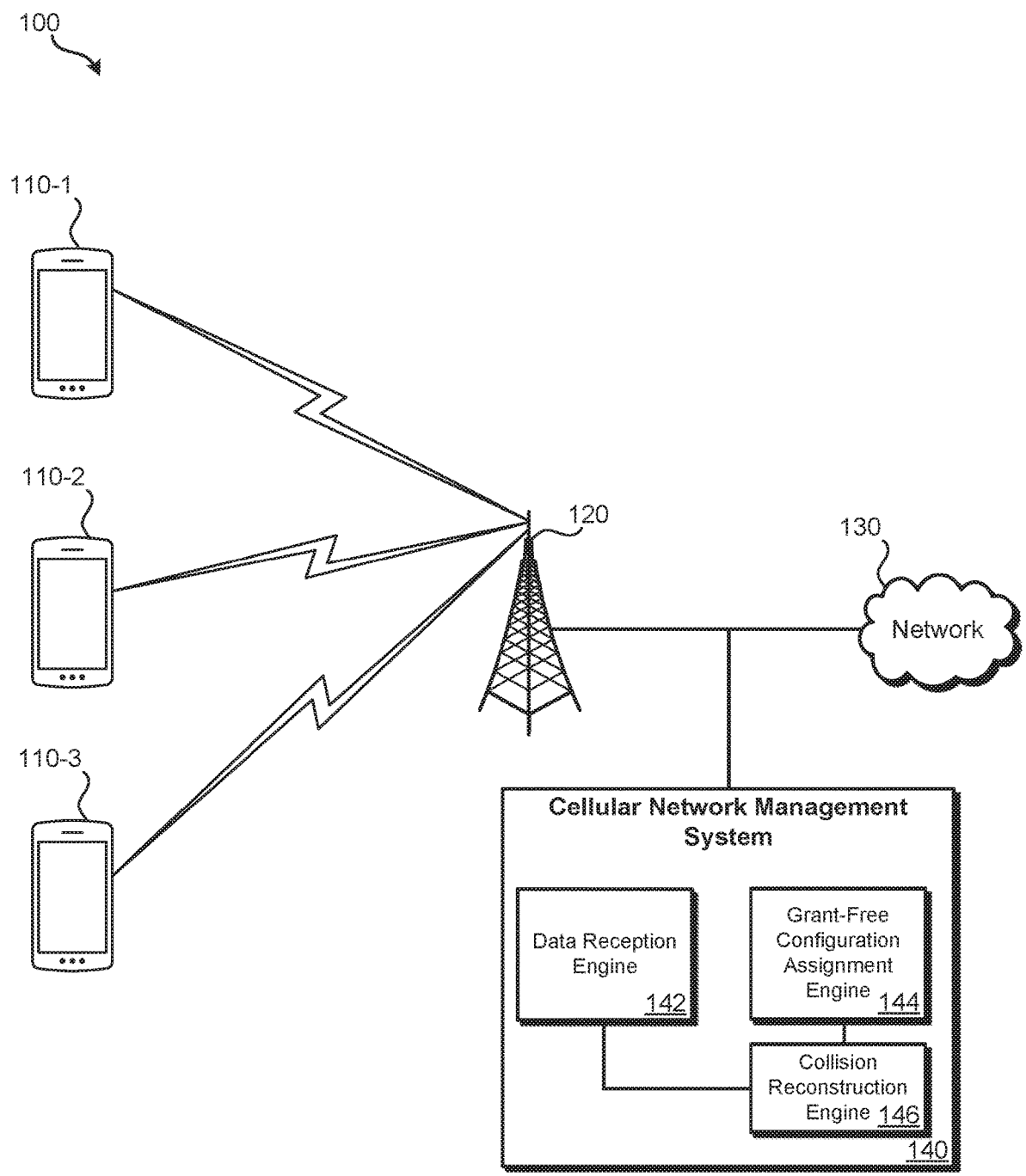
FIG. 1 illustrates an example of a cellular system in which multiple instances of user equipment are communicating with a base station.

FIG. 1 illustrates an example of a cellular communication system 100 in which multiple instances of UE are communicating with a base station. Instances of UE may be forms of wireless electronic devices that can communicate with a cellular network, which may use 5G NR as the air interface. Other forms of cellular networks are possible. Instances of UE may be cellphones, smartphones, network-connected vehicle systems, computers, tablet computers, gaming devices, smart-home devices, smart sensors, etc. Multiple instances of UE 110 may communicate with base station 120. Base station 120 may provide access to network 130 (which may be a public network (e.g., the Internet), a private network (e.g., provider-operated communication network), or some combination thereof). Base station 120 may be part of a cellular network, such as a 5G NR cellular network. Base station 120 may be a gNodeB. Base station 120 may serve a particular geographical area, with other base stations serving neighboring geographical areas that at least partially overlap. Services provided by the cellular network can include network access (e.g., Internet access), data reporting, telephone calls, text messaging services, etc. Such services may generally rely on packetized data being exchanged between the UE and the base station.

The cellular network, of which base station 120 is a member, may support grant-free (GF) transmissions. For example, the 3GPP 5G NR (New Radio) specification (also referred to as 5G NR, for short) allows for GF uplink transmissions from UE to a base station. A GF transmission refers to a data transmission from an instance of UE to the base station that is sent by the UE during a time window and at a frequency previously allocated to the UE by the base station. Some number of recurring resource units may be allocated to the UE for GF transmissions. A "resource unit" refers to a defined time-window that reoccurs periodically at a defined frequency. An instance of UE may be scheduled particular reoccurring resource units, such as detailed in relation to FIG. 2, during which the UE is permitted to transmit data to base station 120 without any additional request or permission being exchanged.

Cellular network management system 140 may be incorporated as part of base station 120 (e.g., part of a gNodeB) or may be part of the cellular network's core network. Therefore, cellular network management system 140 may be incorporated at a location of base station 120, the gNodeB, or remote from base station 120. Cellular network management system 140 may be a computerized system and may include one or more special-purpose or general-purpose processors. Such special-purpose processors may include processors that are specifically designed to perform the functions detailed herein. Such special-purpose processors may be ASICs or FPGAs which are general-purpose components that are physically and electrically configured to perform the functions detailed herein. Such general-purpose processors may execute special-purpose software that is stored using one or more non-transitory processor-readable mediums, such as random access memory (RAM), flash memory, a hard disk drive (HDD), or a solid state drive (SSD).

Cellular network management system 140 can include: data reception engine 142; grant-free configuration assignment engine 144; and collision reconstruction engine 146. Grant-free configuration assignment engine 144 may create a schedule for various instances of UE (such as UE 110-1, 110-2, and 110-3) to send GF transmissions. Grant-free configuration assignment engine 144 may select particular time windows and frequencies, such as exemplified in FIGS. 2 and 3, for instances of user equipment. Grant-free configuration assignment engine 144 may attempt to not assign the same time window and frequency combination to more than one instance of user equipment. However, in some situations, if an instance of user equipment has not transmitted a grant-free transmission in a significant period of time, for the sake of efficiency, an overlapping time window and frequency combination may be assigned to another instance of UE.

In 3GPP NR Rel-15, an instance of UE is assigned a single grant-free configuration. However, in 3GPP NR Rel-16, multiple grant-free configurations may be assigned to an instance of UE. Grant-free configuration assignment engine 144 may assign multiple GF configurations to some or all instances of user equipment. Grant-free configuration assignment engine 144 may further indicate whether or not an instance of user equipment is permitted to use more than one of the GF configurations at a time. If not permitted to use more than one GF configuration at a time, the instance of user equipment that receives the GF configuration assignments may select which GF configuration to use. Alternatively, if the instance of user equipment is permitted to use more than one GF configuration at a time, the instance of user equipment may select to use a subset or all of the available GF configurations, such as to send replications of the same data using the multiple GF configurations. The GF configurations set by grant-free configuration assignment engine 144 may be transmitted to instances of user equipment 110 via base station 120. Grant-free configuration assignment engine 144 may maintain a database that indicates which resource units of different GF transmission configurations are equivalent. The base station can expect the same data to be transmitted by an instance of UE on equivalent resource units of different GF transmission configurations. For example, the fifth resource unit of a first GF transmission configuration can be expected to contain the same data as the fifth resource unit of a second GF transmission configuration.

Data reception engine 142 may analyze received data from instances of user equipment 110. Data reception engine 142 may determine whether a collision between received data from multiple sources has occurred. For instance, instance of UE 110-1 and instance of UE 110-3 may have been scheduled by grant-free configuration assignment engine 144 to be permitted to send grant-free transmissions during the same time window on the same frequency. As previously discussed, such double scheduling may have occurred because one of these instances of user equipment had not transmitted a grant-free transmission for a significant period of time. If data reception engine 142 determines that a collision has occurred, further processing may be performed in an attempt to recover received data from the collision. Such data recovery may be performed using collision reconstruction engine 146.

Data reception engine 142 may also determine whether an instance of user equipment is transmitting data according to multiple GF configuration assignments. If the instance of user equipment is transmitting data using multiple GF transmission configurations and a collision is not detected, data reception engine 142 can discard data received via all but one of the GF transmission configurations, due to such data being duplicative.

Collision reconstruction engine 146 may be activated in response to data reception engine 142 detecting a data collision between grant-free transmissions received from multiple instances of user equipment at the same time window on the same frequency. Collision reconstruction engine 146 may access grant-free configuration assignment engine 144 to determine if at least some of the data involved in the collision was received separately as part of a different grant-free configuration transmission. If the collision involved an instance of data transmitted according to a first GF transmission configuration, the data may have been (or will be) received again according to a second GF transmission configuration. This data may then also be used to reconstruct the data involved in the collision. Further detail is provided in relation to FIGS. 4, 5, and 7.

Figure 2:
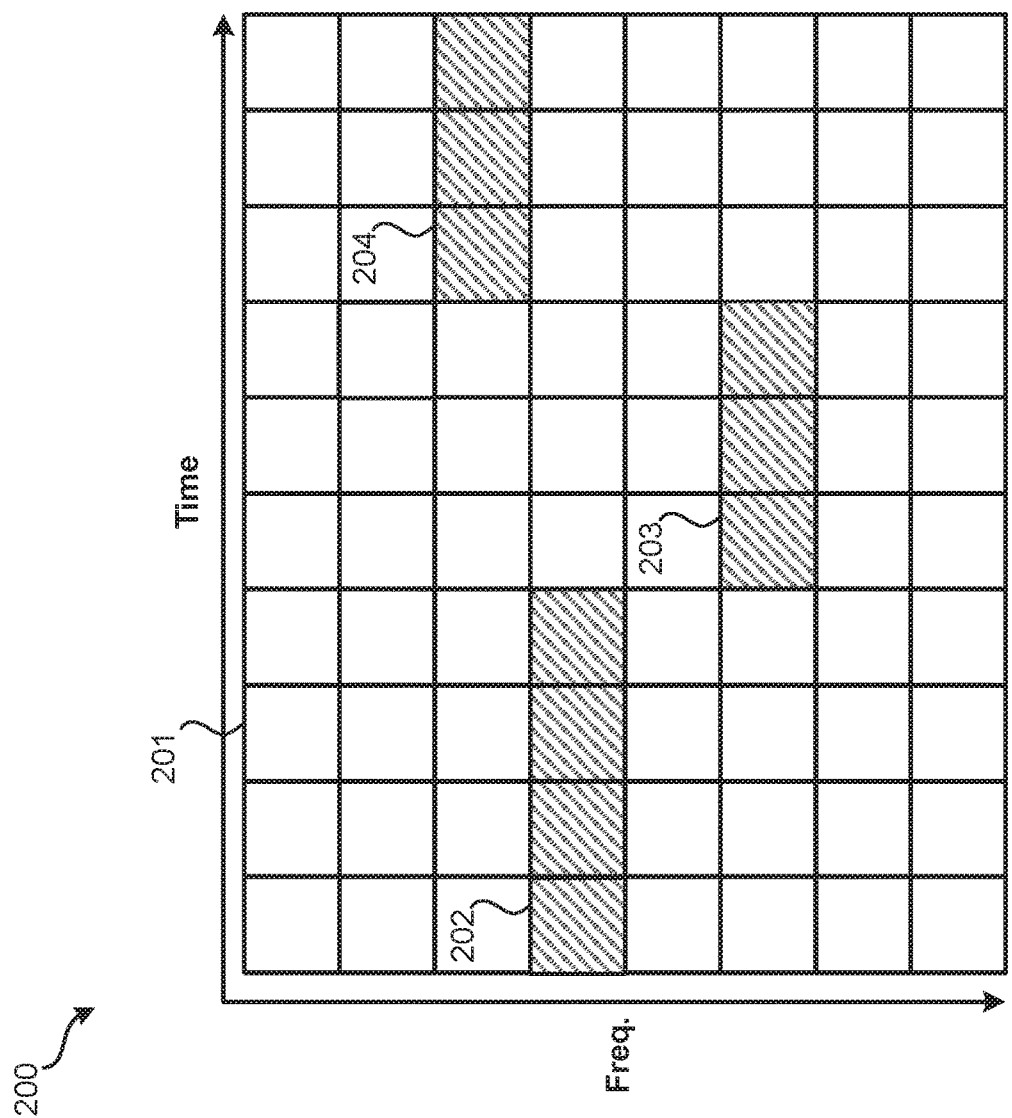
FIG. 2 illustrates GF transmissions being sent during GF resource units allocated to an instance of UE according to a first GF transmission configuration.

FIG. 2 illustrates an arrangement 200 of GF transmissions being sent during GF resource units being allocated to an instance of UE according to a first GF transmission configuration. Along the x-axis, various time windows are illustrated. Along the y-axis, different frequencies are indicated. Each block, such as block 201, may represent multiple of 12 sub-carriers in the frequency domain. In the time domain, the resource unit can include multiple slots or mini-slots. Arrangement 200 may periodically repeat. Thus, a GF transmission configuration may be reused indefinitely by an instance of UE, until a predefined expiration time, or until the base station revokes the GF transmission configuration.

In arrangement 200, an instance of UE has been allotted resource units for GF transmissions. The GF transmission configuration provided to the instance of UE defines resource units 202, resource units 203, and resource units 204. Therefore, after receiving the GF transmission configuration specifying resource units 202-204, this instance of UE is permitted to repeatedly transmit at the frequencies and time windows defined by resource units 202-204. If no data needs to be transmitted by the UE as a GF transmission, no transmission may be sent at some or all of resource units 202, 203, and 204 until data to be transmitted is available.

Figure 3:
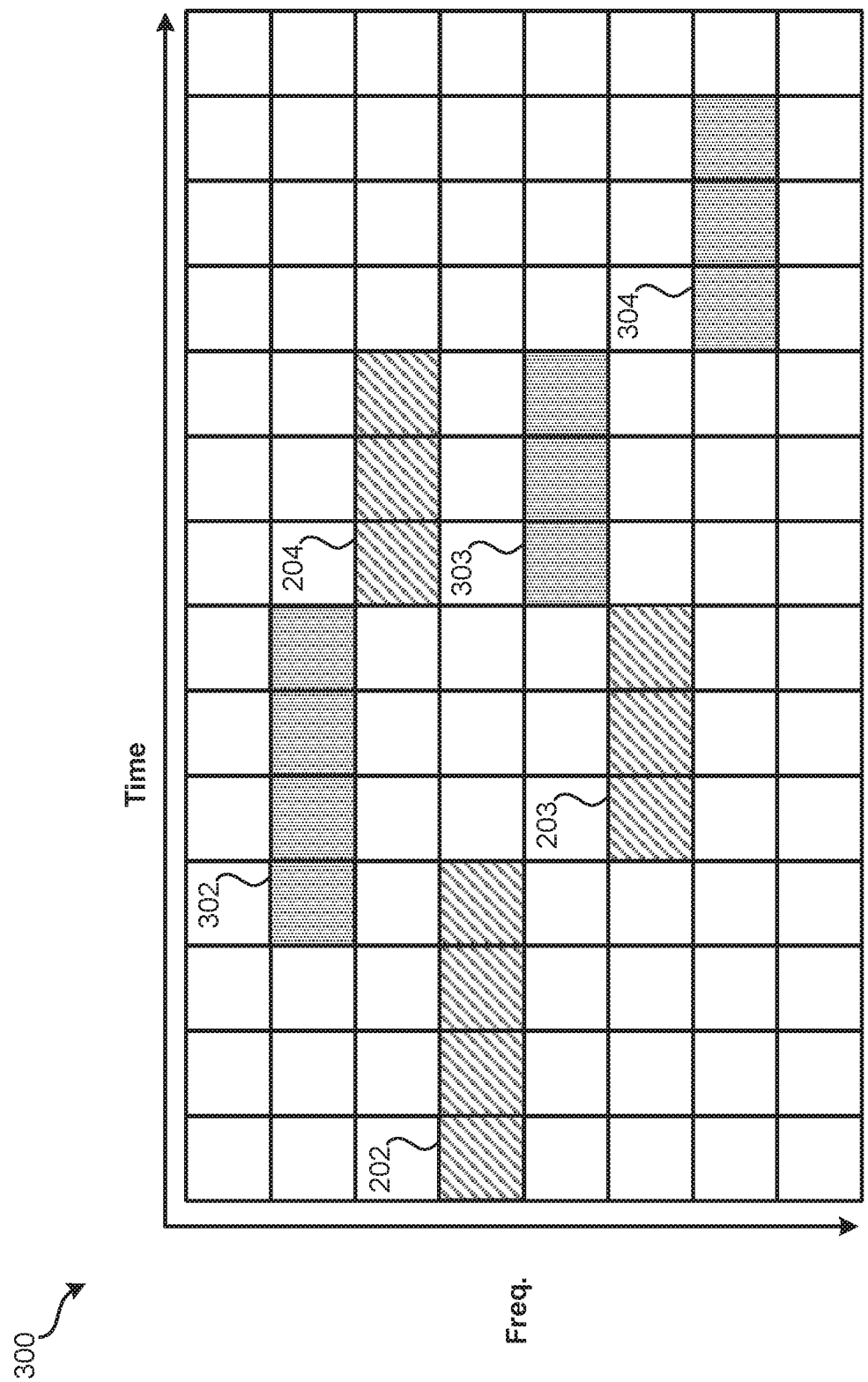
FIG. 3 illustrates replicated GF transmissions being sent during GF resource units allocated to the instance of UE according to first and second GF transmission configurations.

FIG. 3 illustrates an arrangement 300 of replicated GF transmissions being sent during GF resource units allocated to the instance of UE according to first and second GF transmission configurations. In arrangement 200, an instance of UE (e.g., UE 110-1) is transmitting GF transmissions using a single GF transmission configuration; however, in arrangement 300, an instance of UE is transmitting GF transmissions using two GF transmission configurations. In arrangement 300, a first GF transmission configuration provided to the instance of UE defines resource units 202, resource units 203, and resource units 204 and a second GF transmission configuration provided to the instance of UE defines resource units 302, resource units 303, and resource units 304.

The data transmitted by the UE using the first GF transmission configuration may match the data transmitted using the second GF transmission configuration. Therefore, the data transmitted as part of resource units 202 may match the data transmitted as part of resource units 302; the data transmitted as part of resource units 203 may match the data transmitted as part of resource units 303; and the data transmitted as part of resource units 204 may match the data transmitted as part of resource units 304. For GF transmission configurations sent to a particular instance of UE, there may be no overlap in particular combinations of frequency and time window. For example, while resource units 204 and resource units 303 may match in time, these resource units are at different frequencies.

After receiving the two GF transmission configurations specifying resource units 202-204 and resource units 302-304, this instance of UE is permitted to repeatedly transmit at the frequencies and time windows defined by resource units 202-204 and 302-304. When data is to be transmitted, the same data may be transmitted using each of the two GF transmission configurations. If no data needs to be transmitted by the UE as a GF transmission, no transmission may be sent at some or all of resource units 202-204 and 302-304 until data to be transmitted is available.

Figure 4:
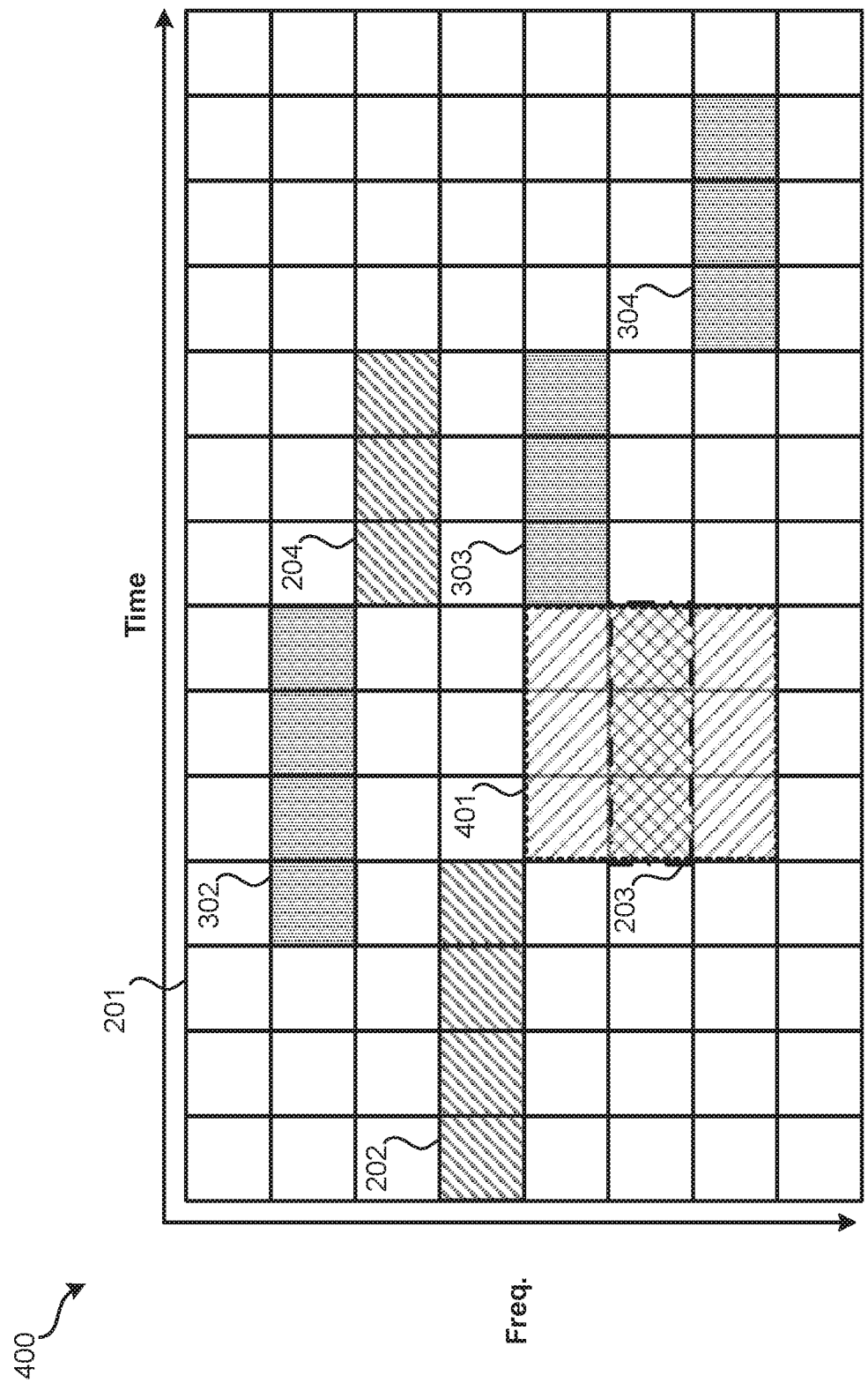
FIG. 4 illustrates replicated GF transmissions being sent during GF resource units allocated to the instance of UE according to first and second GF transmission configurations and a collision occurring.

FIG. 4 illustrates an arrangement 400 of replicated GF transmissions being sent during GF resource units allocated to the instance of UE (assumed to be UE 110-1 for this example) according to first and second GF transmission configurations and a collision occurring. In the illustrated embodiment of arrangement 400, assume that in each resource unit in which a UE is eligible to transmit, it has transmitted data. Similar to arrangement 300, an instance of UE has been allocated a first and second GF transmission configurations, with the first GF transmission configuration comprising resource units 202-204 and the second GF transmission configuration comprising resource units 302-304. Additionally, a second instance of UE (assumed to be UE 110-3 for this example) is allocated resource units 401.

In arrangement 400, a collision has occurred at the base station at resource units 203. At resource units 203, two instances of UE transmitted data. In resource units 401, which include resource units 203, the base station has received data packets from UE 110-3. Therefore, it is possible that resource units 203 were allocated as part of GF transmission configurations to multiple instances of UE, thus creating the possibility of the collision occurring.

The collision, without any additional information, can make the data received from both instances of UE undecipherable. However, since at least the data transmitted by UE 110-1 is transmitted using multiple GF transmission configurations, the data transmitted by UE 110-1 can be recovered from other resource units, and, in turn, this recovered data can be used to perform interference cancellation to recover the data transmitted by UE 110-3 at resource units 203. Based upon the known GF transmission configurations of UE 110-1, a collision reconstruction engine (e.g., collision reconstruction engine 146) can determine that the data involved in the collision at resource units 203 was also transmitted at resource units 303 in accordance with a second GF transmission scheme. Therefore, the data received on resource units 303 can be substituted for the data that would have been received from UE 110-1 at resource units 203. Further, the replication of the data received on resource units 303 can be used to perform data recovery (e.g., successive interference cancellation) to reconstruct the data transmitted by UE 110-3 at resource units 203. Accordingly, by the cellular network having provided multiple GF transmission configurations to UE 110-1 and UE 110-1 being configured to send the same data using the multiple GF transmission configurations, both the data transmitted by UE 110-1 and the data transmitted by UE 110-3 involved in the collision at resource units 203 can be recovered and, thus, prevent retransmission of either instance of data from being necessary.

Figure 5:
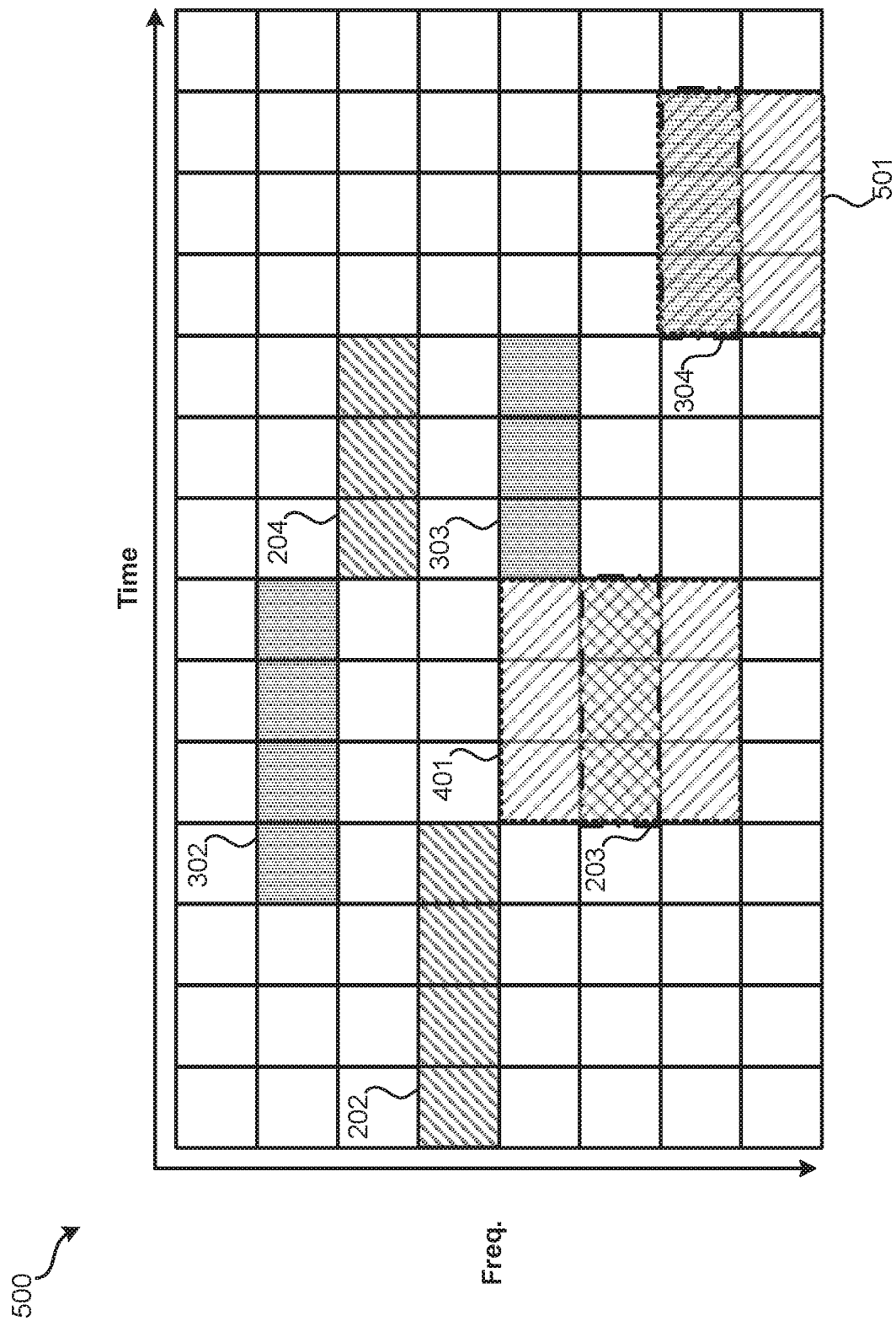
FIG. 5 illustrates replicated GF transmissions being sent during GF resource units allocated to the instance of UE according to first and second GF transmission configurations and multiple collisions occurring.

FIG. 5 illustrates an arrangement 500 of replicated GF transmissions being sent during GF resource units allocated to the instance of UE according to first and second GF transmission configurations and multiple collisions occurring. In the illustrated embodiment of arrangement 500, assume that in each resource unit in which a UE is eligible to transmit, it has transmitted data. Similar to arrangements 300 and 400, an instance of UE has been allocated first and second GF transmission configurations, with the first GF transmission configuration comprising resource units 202-204 and the second GF transmission configuration comprising resource units 302-304. However, in arrangement 500, a second instance of UE (assumed to be UE 110-3 for this example) is allocated resource units 401 and resource units 501. A collision has occurred on resource units 203 and resource units 304.

The data involved in the collision of resource units 203 can be recovered as detailed in relation to arrangement 400. Regarding the collision at resource units 304, in some embodiments the data transmitted by UE 110-1 at resource units 304 may not need to be recovered since the base station has already successfully received the same data at resource units 204. The data from resource units 204 may be used to perform data recovery (e.g., successive interference cancellation) on resource units 304 in order to recover data transmitted by UE 110-3.

Figure 6:
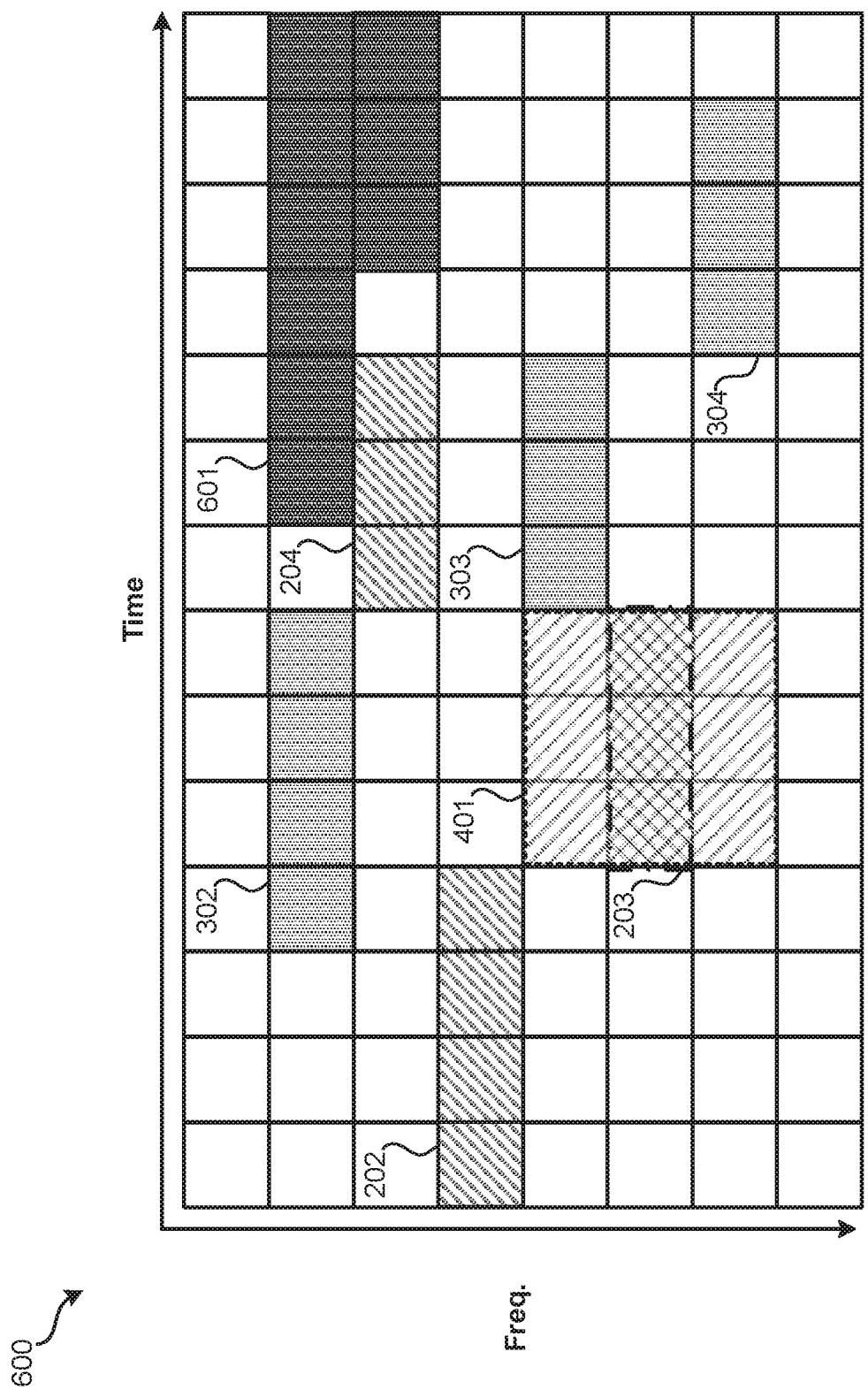
FIG. 6 illustrates replicated GF transmissions being sent during GF resource units allocated to the instance of UE according to first and second GF transmission configurations and a collision occurring that does not require data reconstruction.

FIG. 6 illustrates an arrangement 600 of replicated GF transmissions being sent during GF resource units allocated to the instance of UE according to first and second GF transmission configurations and a collision occurring. In arrangement 600, both instances of UE are transmitting repetitions of data using two GF transmission configurations. As in the earlier arrangements, an instance of UE, assumed to be UE 110-1 for this example, transmits the same data using a first GF transmission configuration using resource units 202-204 and a second GF transmission configuration using resource units 302-304. Additionally, another instance of UE, assumed to be UE 110-3 for this example, transmits its data using a third GF transmission configuration using resource units 401 and a fourth GF transmission configuration using resource units 601.

In arrangement 600, while a collision occurred at resource units 203, no data reconstruction may need to be performed since the data involved in the collision is also received via other resource units by the base station. That is, the data transmitted by UE 110-1 on resource units 203 is also received by the base station on resource units 303; the data transmitted by UE 110-3 on resource units 203 is also received by the base station on resource units 601. Therefore, since the wireless network is aware of each UE's multiple GF transmission configurations and that the data transmitted via the multiple GF transmission configurations are repetitions, the cellular network can discard the data involved in the collision at resource units 203.

In arrangements 200 through 600, at most a UE is indicated as having been assigned two GF transmission configurations. In other embodiments, a greater number of GF transmission configurations may be assigned to an instance of UE. In some embodiments, while one instance of UE may be assigned one number of GF transmission configurations, another instance of UE may be assigned a different number of GF transmission configurations. Further, in some situations, only some instances of UE may be authorized to simultaneously use multiple GF transmission configuration while other instances of UE are required to select only a particular GF transmission configuration to use.

Figure 7:
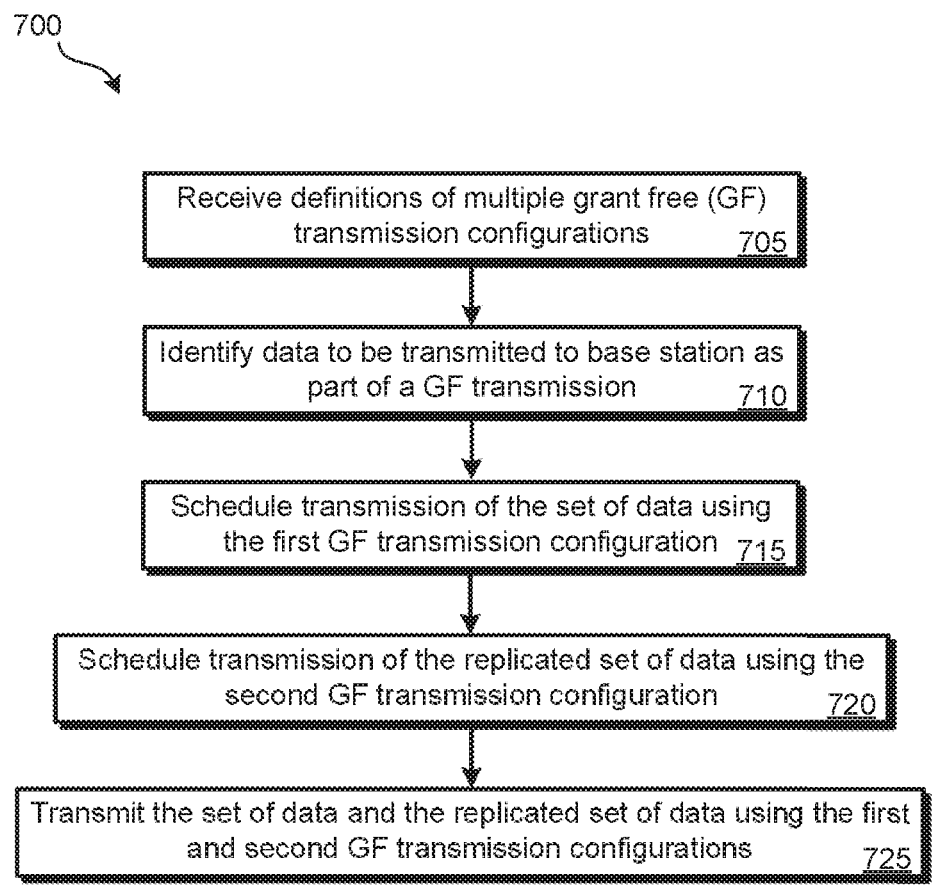
FIG. 7 illustrates an embodiment of a method for an instance of UE transmitting data according to multiple GF transmission configurations.

Various methods may be performed using cellular communication system 100. FIG. 7 illustrates an embodiment of a method 700 for an instance of UE transmitting data according to multiple GF transmission configurations. Each step of method 700 may be performed by a particular instance of UE, such as a smartphone, smart sensor, cellular modem, or other form of end-user equipment that communicates with a base station, such as a gNodeB of a 5G NR cellular network.

At blocks 705, the instance of user equipment may receive definitions of multiple GF transmission configurations from a base station. Each GF transmission configuration may define multiple resource units, wherein each resource unit is indicative of a particular frequency and time window during which the instance of user equipment is permitted to transmit data to the base station without first requesting permission from the base station. The resource units indicated by each GF transmission configuration may periodically reoccur at a defined time interval. In some embodiments, as part of blocks 705, the user equipment may receive an indication of whether the instance of user equipment is permitted to transmit data using more than one of the GF transmission configurations. If the instance of user equipment is permitted to transmit using more than one of the GF transmission configurations, the user equipment may transmit the same data using the multiple GF transmission configurations. Therefore, the same data may be transmitted twice if two GF transmission configurations are used or may be transmitted three times if three GF transmission configurations are used to transmit GF transmissions by the instance of UE.

At block 710, the instance of UE can identify a set of data to be transmitted to the base station of the cellular network in the form of packets as a GF transmission. At block 715, the set of data may be scheduled for transmission using a first GF transmission configuration of the multiple GF transmission configurations received at block 705. Block 720 may be performed if the instance of UE is permitted to transmit data using multiple GF transmission configurations simultaneously. Similarly, at block 720, the same set of data, which can be referred to as a replication of the set of data, may be scheduled for transmission using the second GF transmission configuration of the multiple GF transmission configurations received at block 705. Therefore, the same data is scheduled to be sent using different resource units to the base station by the instance of UE.

At block 725, the set of data and the replicated set of data are transmitted to the base station using the first GF transmission configuration and the second GF transmission configuration, respectively. Therefore, the same data is transmitted twice according to two different GF transmission configurations that were previously defined by the cellular network. While the detailed embodiment of method 700 is focused on using two GF transmission configurations to transmit data, more than GF transmission configurations may be used in other embodiments to send replications of the data.

Figure 8:
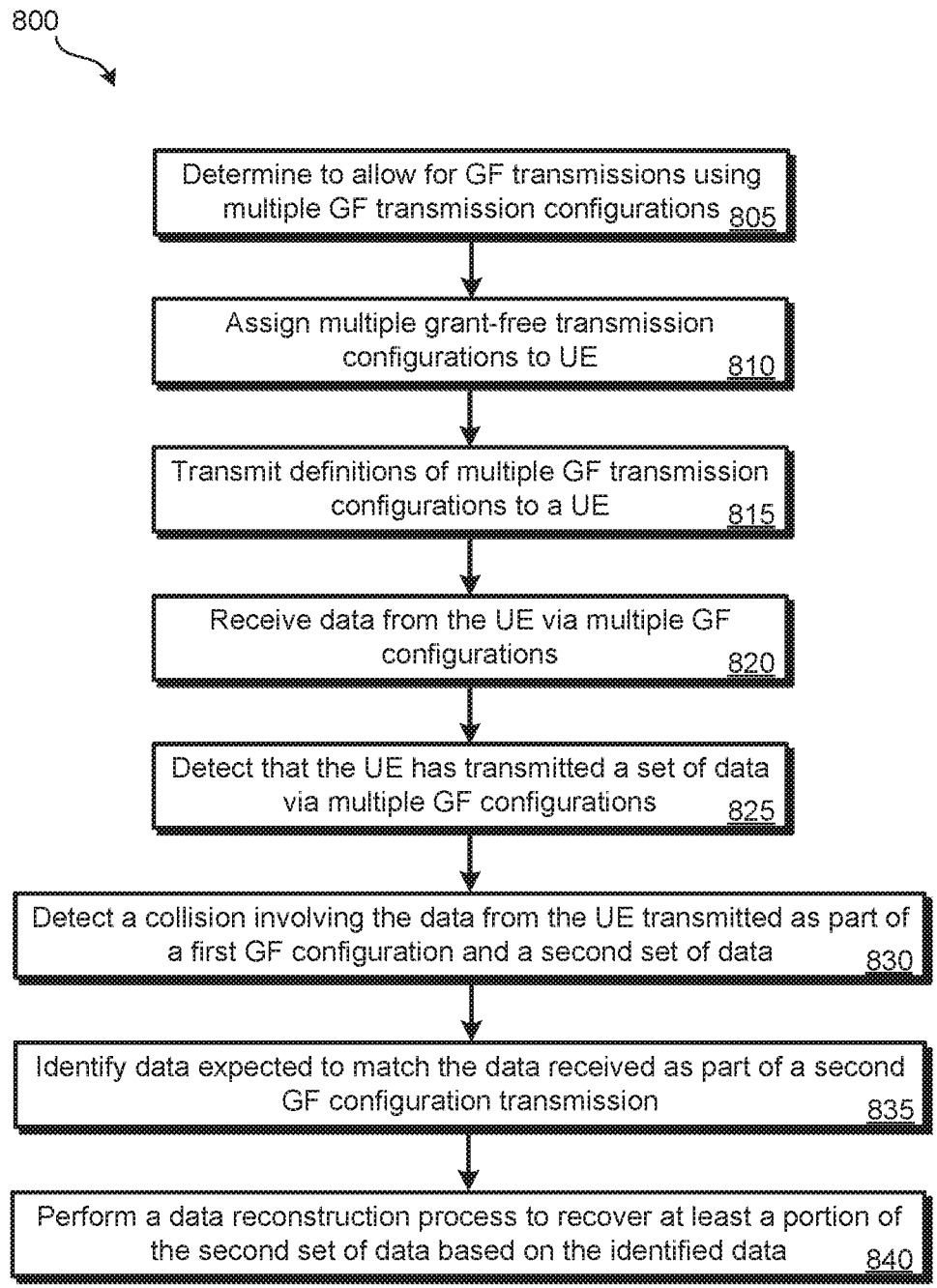
FIG. 8 illustrates an embodiment of a method for a base station receiving data from an instance of UE according to multiple GF transmission configurations and performing interference cancellation on data received during a collision.

FIG. 8 illustrates an embodiment of a method 800 for a base station receiving data from a first instance of UE according to multiple GF transmission configurations and performing interference cancellation on data received during a collision. Each step of method 800 may be performed by a cellular network, such as a 5G NR cellular network. More specifically, the steps of method 800 may be performed by a gNodeB, core components of the cellular network, or some combination thereof.

At block 805, a determination may be made that GF transmissions are going to be permitted to be made by the first instance of UE using multiple GF transmission configurations. Such a determination may be made by the cellular network for only some instances of UE, only the particular instance of UE, or for all instances of UE in communication with a particular base station. The determination may be based on the amount of traffic, the number of instances of UE communicating with the base station, etc.

At block 810, multiple grant-free transmission configurations may be assigned to the first instance of UE. One or more records indicating the assigned GF transmission configurations may be stored by the cellular network, such as part of grant-free configuration assignment engine 144. The cellular network may analyze the resource units available for grant-free transmissions and create or select at least two GF transmission configurations for the first instance of UE. For instance, resource units on which GF transmissions are not frequently being sent by UE or are assigned in the fewest number of GF transmission configurations may be assigned to the GF transmission configurations for this first instance of UE. At block 815, the multiple definitions of GF transmission configurations may be transmitted to the first instance of UE by the cellular network, such as via a gNodeB. In some embodiments, either separately or in the same one or more messages, an indication may be transmitted to the first instance of UE that indicates that the first instance of UE is permitted to transmit GF transmissions using more than one GF transmission configurations simultaneously, based on the determination of block 805. By being able to transmit using multiple GF transmission configurations simultaneously, this means that at least two GF transmission configurations will be used to transmit data packets to the cellular network in a set of resource units, such as in arrangement 300.

At block 820, the first instance of UE, as detailed in method 700, transmits data using multiple GF transmission configurations. The same set of data can be transmitted using each GF transmission configuration. Therefore, if the first instance of UE transmits the set of data using two GF transmission configurations, the set of data is transmitted twice. The cellular network may detect that the first instance of UE is transmitting using the multiple GF transmission configurations at block 825. In some embodiments, the first instance of UE may transmit a message indicating which GF transmission configurations it will transmit packets on. In other embodiments, based on which resource units data is received from the first instance of UE, the cellular network can perform a lookup to determine which GF transmission configurations that were previously assigned to the first instance of UE correspond to the resource units on which the first instance of UE is transmitting.

At block 830, a collision between data transmitted by the instance of UE and a second instance of UE occurs. This collision involves data being transmitted on the same frequency and time window to the base station of the cellular network by both instances of UE. The cellular network, without further data, would be unlikely to be able to decipher the data involved in the collision from both instances of UE. The data from the first instance of UE is determined to have been transmitted according to a first GF transmission configuration.

At block 835, data received from the first instance of UE, according to a second GF transmission configuration that is expected to match the data received from the first instance of UE according to the first transmission configuration involved in the collision, is identified. Each GF transmission configuration assigned to the first instance of UE may be mapped to each other, such that each resource unit of a GF transmission configuration can be mapped to a corresponding resource unit of the other assigned GF transmission configurations. As such, the resource units of the first GF transmission configuration involved in the collision can be mapped to resource units of the second GF transmission configuration expected to contain the same data.

The data transmitted by the instance of UE according to the second GF transmission configuration can then be used to perform data reconstruction on the data involved in the collision at block 840. Such as by performing successive interference cancellation (SIC), the data known to have been transmitted at the resource units involved in the collision by the first instance of UE can be used to reconstruct the data transmitted by the second instance UE at the resource units involved in the cancelation. As such, all of the data from the two instances of UE involved in the collision can be recovered.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A system for using multiple grant-free transmission configurations, the system comprising:
    a cellular wireless network comprising a plurality of base stations, configured to:
        assign a plurality of grant-free transmission configurations to an instance of user equipment, wherein:
            each grant-free transmission configuration of the plurality of grant-free transmission configurations defines one or more time-windows and one or more frequencies corresponding to the one or more time-windows; and
transmit indications of the plurality of grant-free transmission configurations to the instance of user equipment; and
the instance of user equipment, configured to:
receive the indications of the plurality of grant-free transmission configurations;
schedule a set of data for transmission using a first grant-free transmission configuration of the plurality of grant-free transmission configurations;
schedule a replication of the set of data for transmission using a second grant-free transmission configuration of the plurality of grant-free transmission configurations; and
transmit the set of data using the first grant-free transmission configuration and the replication of the set of data using the second grant-free transmission configuration;
wherein the cellular wireless network is further configured to:
receive the replication of the set of data according to the second grant-free transmission configuration;
detect that the instance of user equipment has transmitted the set of data using the first grant-free transmission configuration and the replication of the set of data using the second grant-free transmission configuration;
detect that a collision has occurred involving the set of data received via the first grant-free transmission configuration and a received second set of data, wherein:
the second set of data was transmitted by a second instance of user equipment;
without additional data, the set of data and the received second set of data are undecipherable; and
reconstruct the received second set of data based on:
the received replication of the set of data transmitted using the second grant-free transmission configuration; and
the set of data having been scheduled by the cellular wireless network for transmission using the first grant-free transmission configuration and as the replication using the second grant-free transmission configuration.

2. The system for using multiple grant-free transmission configurations of claim 1, wherein the cellular wireless network being configured to reconstruct the received second set of data comprises the cellular wireless network performing successive interference cancellation (SIC) on the received second set of data using the received replication of the set of data.

3. The system for using multiple grant-free transmission configurations of claim 1, wherein the cellular wireless network uses a 5G NR air interface and the plurality of base stations are gNodeBs.

4. The system for using multiple grant-free transmission configurations of claim 1, wherein each grant-free transmission configuration of the plurality of grant-free transmission configurations defines a plurality of time windows and a plurality of frequencies.

5. The system for using multiple grant-free transmission configurations of claim 1, wherein there is no repeated combination of a time window and frequency in the plurality of grant-free transmission configurations.

6. The system for using multiple grant-free transmission configurations of claim 1, wherein the cellular wireless network is further configured to:
determine to authorize grant-free transmissions for the instance of user equipment using multiple grant-free transmission configurations; and
transmit a message to the instance of user equipment that indicates the instance of user equipment is authorized to transmit grant-free transmissions using more than one grant-free transmission configuration.

7. The system for using multiple grant-free transmission configurations of claim 6, wherein the instance of user equipment is further configured to:
determine to transmit grant-free transmissions using multiple grant-free transmission configurations at least in part based on receiving the message that indicates the instance of user equipment is authorized to transmit grant-free transmissions using more than one grant-free transmission configuration.

8. A method for using multiple grant-free transmission configurations, the method comprising:
assigning, by a cellular network, a plurality of grant-free transmission configurations to an instance of user equipment, wherein:
the plurality of grant-free transmission configurations comprises a first grant-free transmission configuration and a second grant-free transmission configuration; and
each grant-free transmission configuration of the plurality of grant-free transmission configurations defines one or more time-windows and one or more frequencies corresponding to the one or more time-windows; and
transmitting, by the cellular network, definitions of the plurality of grant-free transmission configurations to the instance of user equipment;
receiving, by the cellular network, a set of data according to the first grant-free transmission configuration;
receiving, by the cellular network, a replication of the set of data according to the second grant-free transmission configuration;
detecting, by the cellular network, that the instance of user equipment has transmitted the set of data using the first grant-free transmission configuration and the replication of the set of data using the second grant-free transmission configuration;
detecting, by the cellular network, that a collision has occurred involving the set of data received via the first grant-free transmission configuration and a received second set of data, wherein:
the second set of data was transmitted by a second instance of user equipment;
without additional data, the set of data and the received second set of data are undecipherable; and
reconstructing, by the cellular network, the received second set of data based on:
the received replication of the set of data transmitted using the second grant-free transmission configuration; and
the set of data having been scheduled by the cellular network for transmission using the first grant-free transmission configuration and as the replication using the second grant-free transmission configuration.

9. The method for using multiple grant-free transmission configurations of claim 8, further comprising:

receiving, by the instance of user equipment, the definitions of the plurality of grant-free transmission configurations;

scheduling, by the instance of user equipment, the set of data for transmission using the first grant-free transmission configuration of the plurality of grant-free transmission configurations;

scheduling, by the instance of user equipment, the replication of the set of data for transmission using the second grant-free transmission configuration of the plurality of grant-free transmission configurations; and transmitting, by the instance of user equipment, the set of data using the first grant-free transmission configuration and the replication of the set of data using the second grant-free transmission configuration.

10. The method for using multiple grant-free transmission configurations of claim 8, wherein the cellular network being configured to reconstruct the received second set of data comprises the cellular network performing successive interference cancellation (SIC) on the second set of data using the received replication of the set of data.

11. The method for using multiple grant-free transmission configurations of claim 8, wherein the cellular network uses a 5G NR air interface and a base station that communicates with the instance of user equipment is a gNodeB.

12. The method for using multiple grant-free transmission configurations of claim 8, wherein each grant-free transmission configuration of the plurality of grant-free transmission configurations defines a plurality of time windows and a plurality of frequencies.

13. The method for using multiple grant-free transmission configurations of claim 8, further comprising:

determining, by the cellular network, to authorize grant-free transmissions for the instance of user equipment using multiple grant-free transmission configurations; and transmitting, by the cellular network, a message to the instance of user equipment that indicates the instance of user equipment is authorized to transmit grant-free transmissions using more than one grant-free transmission configuration.

14. The method for using multiple grant-free transmission configurations of claim 13, further comprising:

determining, by the instance of user equipment, to transmit grant-free transmissions using multiple grant-free transmission configurations at least in part based on receiving the message that indicates the instance of user equipment is authorized to transmit grant-free transmissions using more than one grant-free transmission configuration.

15. A non-transitory processor-readable medium for using multiple grant-free transmission configurations, comprising processor-readable instructions configured to cause one or more processors to:

assign a plurality of grant-free transmission configurations to an instance of user equipment, wherein:

the plurality of grant-free transmission configurations comprises a first grant-free transmission configuration and a second grant-free transmission configuration; and each grant-free transmission configuration of the plurality of grant-free transmission configurations defines one or more time-windows and one or more frequencies corresponding to the one or more time-windows; and cause definitions of the plurality of grant-free transmission configurations to be transmitted to the instance of user equipment;

receive a set of data according to the first grant-free transmission configuration;

receive the replication of the set of data according to the second grant-free transmission configuration;

detect that the instance of user equipment has transmitted the set of data using the first grant-free transmission configuration and the replication of the set of data using the second grant-free transmission configuration;

detect that a collision has occurred involving the set of data received via the first grant-free transmission configuration and a received second set of data, wherein:

the second set of data was transmitted by a second instance of user equipment;

without additional data, the set of data and the received second set of data are undecipherable; and reconstruct the received second set of data based on:

the replication of the set of data transmitted using the second grant-free transmission configuration; and the set of data having been scheduled for transmission using the first grant-free transmission configuration and as the replication using the second grant-free transmission configuration.

\* \* \* \* \*